United States Patent
Lorrette et al.

(10) Patent No.: US 9,236,151 B2
(45) Date of Patent: Jan. 12, 2016

(54) PROCESS FOR FABRICATION OF A PART WITH TUBULAR GEOMETRY MADE FROM A CERAMIC MATRIX COMPOSITE MATERIAL

(75) Inventors: Christophe Lorrette, Villenave D'Ornon (FR); Daniel Nunes, Saclay (FR); Cédric Sauder, Saint Arnoult en Yvelines (FR)

(73) Assignee: COMMISSARIAT A L'ENERGIE ATOMIQUE ET AUX ENERGIE ALTERNATIVES, Paris (FR)

( * ) Notice: Subject to any disclaimer, the term of this patent is extended or adjusted under 35 U.S.C. 154(b) by 552 days.

(21) Appl. No.: 13/564,281

(22) Filed: Aug. 1, 2012

(65) Prior Publication Data

US 2013/0034655 A1    Feb. 7, 2013

(30) Foreign Application Priority Data

Aug. 4, 2011   (FR) ...................... 11 57154

(51) Int. Cl.

| | | |
|---|---|---|
| *B21F 9/00* | (2006.01) | |
| *B66F 3/00* | (2006.01) | |
| *G21C 3/06* | (2006.01) | |
| *C04B 35/52* | (2006.01) | |
| *C04B 35/565* | (2006.01) | |
| *C04B 35/80* | (2006.01) | |
| *C04B 35/83* | (2006.01) | |
| *G21C 21/00* | (2006.01) | |

(52) U.S. Cl.
CPC . *G21C 3/06* (2013.01); *C04B 35/52* (2013.01); *C04B 35/565* (2013.01); *C04B 35/806* (2013.01); *C04B 35/83* (2013.01); *G21C 21/00* (2013.01); *C04B 2235/5244* (2013.01); *C04B 2235/5248* (2013.01); *C04B 2235/5252* (2013.01); *C04B 2235/614* (2013.01); *C04B 2235/94* (2013.01); *Y02E 30/40* (2013.01)

(58) Field of Classification Search
USPC .................................... 254/231–234
See application file for complete search history.

(56) References Cited

U.S. PATENT DOCUMENTS

| | | | | |
|---|---|---|---|---|
| 3,960,359 | A | * | 6/1976 | Svahn et al. ................... 254/231 |
| 4,560,147 | A | * | 12/1985 | Bowdren ........................ 254/231 |
| 5,125,179 | A | | 6/1992 | Campbell et al. |
| 5,159,729 | A | * | 11/1992 | Walker ........................ 24/68 CD |
| 6,174,595 | B1 | | 1/2001 | Sanders |
| 6,176,145 | B1 | * | 1/2001 | Jackson ........................ 74/89.13 |
| 7,451,962 | B1 | * | 11/2008 | Kennedy ........................ 254/233 |
| 2003/0010966 | A1 | * | 1/2003 | Sjostedt ........................ 254/231 |
| 2003/0178611 | A1 | * | 9/2003 | Anderson ...................... 254/231 |
| 2004/0088833 | A1 | * | 5/2004 | Wecke et al. .............. 24/136 R |
| 2006/0039524 | A1 | | 2/2006 | Feinroth et al. |
| 2007/0175583 | A1 | | 8/2007 | Mosaliam |

OTHER PUBLICATIONS

French Preliminary Search Report; Apr. 24, 2012.

* cited by examiner

*Primary Examiner* — Emmanuel M Marcelo
(74) *Attorney, Agent, or Firm* — Pearne & Gordon LLP

(57) ABSTRACT

A device for tensioning a preform made from interlaced fibers is applied to tension the preform used in a process for fabricating a part made from a ceramic matrix composite material. During this process, the preform is tensioned before and during its densification using the tensioning device (100), which comprises a main body (2), a first assembly element (3) and a second assembly element (4) and a control rod, rotation of the control rod causing translation of the second assembly element, separation of the first and second assembly elements from each other and tensioning of the preform along the longitudinal direction.

5 Claims, 3 Drawing Sheets

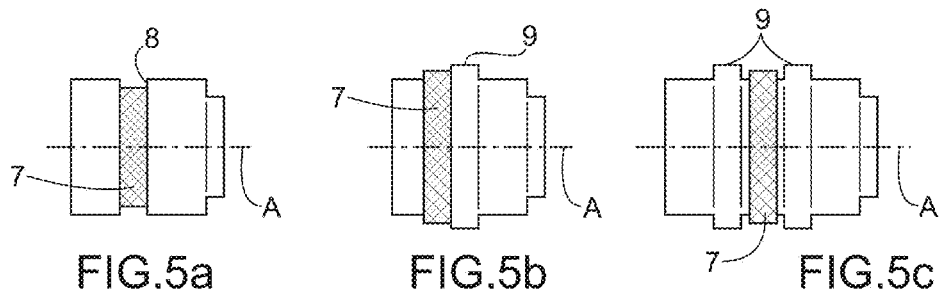
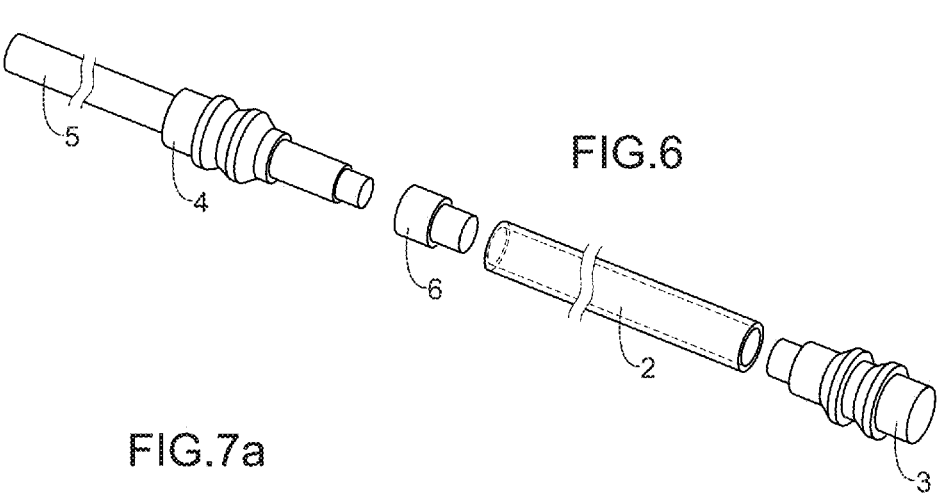
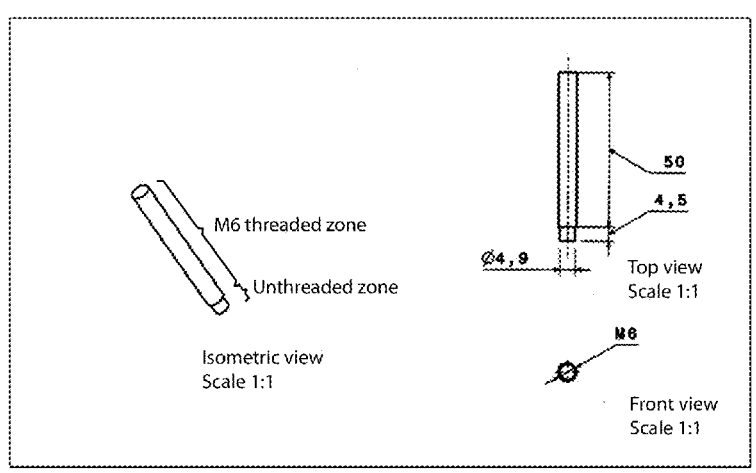

PROCESS FOR FABRICATION OF A PART WITH TUBULAR GEOMETRY MADE FROM A CERAMIC MATRIX COMPOSITE MATERIAL

TECHNICAL FIELD

This invention relates to the field of fabrication of parts made from a ceramic matrix composite material.

It is particularly applicable to fabrication of hollow parts extending along a longitudinal direction with a reinforcement made from interlaced and preferably braided fibres.

It also concerns a particular tensioning device used during fabrication of these hollow parts so that their reinforcements can be put into tension.

STATE OF PRIOR ART

Parts made from ceramic matrix composite (CMC) materials are composed of a ceramic matrix reinforced by a fibrous structure; the fibrous structure provides the mechanical strength of the part, while the matrix provides cohesion for it.

Parts made from CMC materials are particularly appreciated in many fields in industry due to their remarkable mechanical properties, particularly in terms of hardness, toughness, resistance to wear and resistance to mechanical and thermal shocks.

For example, such parts are used in the aeronautical industry to make brake disks or structural parts that will be used in manufacturing of jets operating at high temperature; they are also used for manufacturing of structural parts in gas turbines, manufacturing of cladding materials for nuclear reactors and for making control rods . . . .

Within the scope of this invention we are particularly interested in parts made from a CMC material for which the fibrous structure (or preform) is made from interlaced fibres, for example braided fibres, and with a preferred direction of tensioning along a longitudinal direction.

For fabrication of such parts, the first step consists of making a porous fibrous preform with the shape and dimensions of the part that is to be obtained.

The fibrous preform is made from continuous fibre wires made from ceramic (for example carbon or silicon carbide fibres); each wire used may comprise up to several hundred fibres, or even several thousand or several tens of thousands of fibres.

At the end of this step, the preform obtained is called the dry preform and it has excellent flexibility and high porosity.

The next step is to perform a so-called densification step that consists of filling in most of the pores in the dry preform by one or several dense ceramic phases (carbon, silicon carbide, etc.) to make the part rigid and to give it useful mechanical properties).

This densification step may be done by different techniques, the best known of which are Chemical Vapour Infiltration (CVI) and Polymer Infiltration and Pyrolysis (PIP).

Regardless of which technique is used for the densification, special tools have to be used which are used as support elements for the preform and that control the mechanical properties and the final geometry of required composite parts. It is obviously essential that these tools should be chemically compatible with the fibrous preform and with the products used (gases and/or liquids) at the high temperatures required by the densification processes used (about 1000° C., or even more).

In the special case of making parts with an axis of revolution (tubes or others), mandrels are frequently used as the preform support; the preform is thus shaped on the mandrel using any fibre interlacing technique, for example by braiding or filament winding around the mandrel.

FIG. 1 shows one example of such a preform 1.

However, it is found that parts made in this way have defects. FIG. 2 shows a tube made from a CMC composite material obtained after the preform densification step, in which it can be seen that the tube comprises serious shape defects (D) near its central part. The Inventors believe that these defects are due to relaxation of the fibrous preform before and/or during the densification step.

Therefore, the Inventors set themselves the objective of designing a device to stretch (tension) a preform and a process for fabrication of a hollow part made from a CMC material extending along a longitudinal direction, but that does not have the disadvantages of prior art.

More precisely, the Inventors attempted to design a fabrication process that can improve the quality of the parts made, namely a process to keep the mechanical properties and/or respect dimensions, tolerances and/or the surface roughness of parts thus made from a CMC material.

PRESENTATION OF THE INVENTION

Therefore, the purpose of the invention is to at least partially remedy the disadvantages mentioned above found in embodiments according to prior art.

To achieve this, the first purpose of the invention is a tensioning device along a longitudinal direction of a preform made from interlaced fibres with a body and two opposite ends, said device comprising the following coaxial elements:

a longitudinal main body that will support the body of the preform;

a first assembly element of the preform, mounted on one of the ends of the main body;

a second assembly element of the preform, mounted by a helical link on a control rod, itself mounted on the other end of the main body free to rotate about its axis;

the control rod being able to turn freely relative to at least one of the elements chosen among the main body and the first assembly element;

these coaxial elements being designed to be capable of cooperating with each other when the ends of the preform are held on the first and second assembly elements, such that rotation of the control rod about its axis will cause translation of the second assembly element about said axis, and consequently separation of the first and second assembly elements from each other along this axis, causing tensioning of the preform along the longitudinal direction.

Separation of the first and second assembly elements will cause lateral displacement of the two assembly elements from a near position to a far position.

Preferably, during rotation of the control rod, at least one of the assembly elements is held fixed relative to a coordinate system external to said tensioning device.

Advantageously, the control rod is assembled onto the end of the main body through an intermediate element, coaxial with the main body and the second assembly element, which is placed between the main body and the second assembly element. This additional element can facilitate rotation of the control rod. The control rod must rotate relative to the main body, and this is made easier by adding this intermediate element that remains fixed relative to the main body. This intermediate element is advantageously chosen from a material with a lower coefficient of friction than the control rod so as to facilitate rotation of the control rod.

Note that the main body of the tensioning device may be a solid element or a hollow element. When it is a hollow element, it may be tubular (mandrel, etc.).

According to one variant, each of the coaxial elements chosen among the main body, the first assembly element and possibly the intermediate element may be free to rotate relative to the control rod.

Advantageously, the control rod is a rod with an external thread and the second assembly element is a nut comprising an internal thread that cooperates with the thread on the control rod. Obviously, the thread axis on the control rod is coincident with the thread axis on the nut. The internal and external threads have the advantage that they enable gradual and smooth tensioning of the preform.

Another purpose of the invention is a process for the fabrication of a hollow part extending along a longitudinal direction made from a ceramic matrix composite material starting from an interlaced fibre preform. This process comprises the following steps:

a) a preform of the part to be made is placed on a tensioning device like that described above;

b) the two ends of the preform are fixed to the first and second assembly elements respectively of the tensioning device;

c) the first and second assembly elements are moved away from each other along the longitudinal direction to tension the preform, by applying a rotation movement to the control rod;

d) a densification treatment is applied to the preform thus tensioned to induce densification of the preform by the formation of a matrix in the preform, the densification treatment being done at a temperature less than the melting temperature of the preform and less than the melting temperature of the device;

e) the tensioning device is removed from the densified preform.

Preferably, the preform is a preform made from fibres braided in two dimensions (2D braid) or fibres braided in three dimensions (3D braid).

The preform can be put into place on the tensioning device by making the preform on the tensioning device directly, or by making the preform beforehand on another support (conventional tool such as a mandrel), and then sliding it onto the tensioning device according to the invention.

Preferably, the parts thus made comprise an axis of revolution; preferably, these parts have a tubular geometry.

Obviously, those skilled in the art will be able to determine the distance that the first and second assembly elements need to move apart to obtain the required tensioning of the preform, by performing a few tests.

The densification treatment may be obtained by several processes known to those skilled in the art; for example, it might be a Chemical Vapour Infiltration (CVI) type treatment.

According to one possible variant of the process, step c) of the process further consists of holding at least one of the elements chosen from among the first and second assembly elements in a coordinate system external to the tensioning device, while the rotation movement is applied.

Advantageously, step b) fixing the two ends of the preform is done by placing clamping means on said two ends of the preform, to apply a radial clamping force on said two ends of the preform oriented towards the axis of said first and second assembly elements and/or by applying an adhesive material firstly at the interface between the first assembly element and one of the two ends of the preform, and secondly between the second assembly element and the other of the two ends of the preform.

According to one variant, it is also possible to apply an adhesive material to the interface between the clamping means and the preform, to make sure that the preform does not slide under the clamping means.

Said clamping means, that mechanically hold the preform on the first and second assembly elements, may for example be clamping flanges or straps knotted around the first and second assembly elements.

Solidarisation between the ends of the preform and the first and second assembly elements can be further improved by adding locking means to these clamping means. Thus, according to one possible variant of the invention, the first and second assembly elements are further provided with locking means to prevent possible translation of the clamping means relative to said first and second assembly elements on which they are placed.

For example, the locking means may be an annular groove, one annular protuberance or two annular protuberances, preferably parallel, made in the first and second assembly elements; the clamping means are then designed to be placed facing the groove, laterally in contact with the protuberance or placed between the two protuberances, thus preventing the clamping means from moving in translation relative to the first and second assembly elements on which there are located.

Preferably, the preform and the hollow part obtained after the fabrication process have a tubular geometry; preferably, the tensioning device and particularly the main body, have a tubular geometry.

Preferably, the tensioning device (and particularly the main body, the first and second assembly elements, the control rod and the intermediate element if there is one) is made from a material with a coefficient of thermal expansion close to or equal to the coefficient of thermal expansion of the preform. For the purposes of this invention, note that a "value close to" means a value that is equal to approximately the value of the coefficient of expansion of the fibrous material used to make the preform (for example a value equal to $\pm 4 \times 10^{-6} K^{-1}$ in the case of a silicon carbide).

The tensioning device can thus advantageously be made from graphite when the preform is made from carbon and/or silicon carbide fibres. The preference for graphite is related to its moderate cost, its chemical and thermal resistance to the different known densification processes according to prior art for making CMC materials, and also because its coefficient of thermal expansion is similar to that of frequently used fibrous preforms (carbon, silicon carbide, etc.), so that the tensioning device can match the expansion of the preform at high temperatures (CVI type densification process) and thus keep a relatively stable tension.

According to one possible variant of the process, step d) to apply a densification treatment to the preform is stopped when the treated preform comprises a fraction by volume of the matrix greater than 5% and not more than 60% of the volume of the matrix of the part to be made and the process also comprises a step f) after step e) in which the tensioning device is removed, step f) consisting of applying a complementary densification treatment to the preform obtained after step e) at a temperature below the melting temperature of the preform, to terminate densification of the preform.

In this variant, the tensioning device of a partially densified preform is removed, and the densification of this partially densified preform is continued and terminated at a temperature below the melting temperature of the preform.

Preferably, the step to apply a densification treatment to the preform is stopped when the volume content of the matrix is equal to not more than 30% of the volume of the matrix of the part to be made, and even more preferably when the volume content of the matrix is not more than 20% or even better when it is not more than 10% of the volume of the matrix of the part to be made.

Step e) to remove the support element of the densified preform can be done by machining the tensioning device.

According to one particular embodiment of the invention in which the main body of the tensioning device is made from silica glass, step e) to remove the tensioning device may also be done by chemical attack of the main body using an acid, preferably hydrofluoric acid, or a base. If the first and second elements are not made from silica glass, they can also be machined or the ends of the preform may be sawn.

One of the advantages of the tensioning device and the fabrication process using this device is that the preform can be deformed along a single direction; the preform is only stretched along a longitudinal direction passing through its two ends, and it cannot be twisted in any way.

Furthermore, as we have just seen above, the solution proposed by the Inventors to at least partially overcome the disadvantages encountered in embodiments according to prior art consists of keeping the preform tensioned during its densification step. Thus, unlike prior art in which the preform remained free of all movements on tooling used as a support (for example a mandrel), the preform in the process according to the invention is kept tensioned. By eliminating all freedom of movement for the preform, it is impossible for the fibres in the preform to "relax" or in other words, to expand around the element acting as a support before or during the preform densification step. Avoiding relaxation of the fibres, which is often an irregular relaxation over the length of the preform, means that target dimensions can be respected along the entire length of the part obtained after densification.

Furthermore, avoiding regular or irregular relaxation of fibres in the preform avoids a reduction in the volume content of fibres in the parts resulting from densification processes known in prior art, such a reduction effectively modifying the mechanical properties of the final part. Indeed, when fibres are relaxed, the volume occupied by the fibres is higher in the portions of the part in which the fibres are relaxed, such that the volume content of fibres in the final part is lower than expected, which reduces the density of the part.

Finally, the tensioning device and its use in the process according to the invention prevent all these disadvantages.

They also enable an optimum volume content of fibres in the part and result in parts with optimum mechanical properties.

Tensioning of the preform during the process according to the invention also guarantees better resistance of the part to internal pressure (swelling) and external pressure. When tensioned, the preform is subject to hoop compression so that the final part can more easily resist subsequent internal swelling (hoop tension).

Internal and external dimensions of the part over its length can also be guaranteed. Note that for example with the process according to the invention, a precision of at least ±0.05 mm can be obtained on the internal and external dimensions of a part over its entire length when an appropriate tension is applied to a preform along the direction of its length (longitudinal direction of the preform).

Finally, use of the tensioning device during the process according to the invention assures reproducibility of geometric dimensions during different fabrications, which is of overriding importance for industrialisation.

In conclusion, the tensioning device and its use in the process according to the invention can improve the quality (density, mechanical properties, respect and reproducibility of dimensions and tolerances over the entire length of the parts) of slender hollow parts made from CMC material, particularly parts with an axis of revolution (for example tubular parts, etc.), obtained from a preform with interlaced and preferably braided fibres. This improvement is particularly appreciable for small diameter parts, namely parts with diameters at a scale of one centimeter or less, typically outside diameters of less than or equal to 15 mm.

The invention will be better understood after reading the description given below in which manufacturing of a tubular shaped part according to the process disclosed in the invention is described in detail.

Obviously, this example is only given for illustration purposes of the invention and in no way limits this subject. In particular, the part may be any shape with an axis of revolution.

BRIEF DESCRIPTION OF THE DRAWINGS

FIGS. 5a, 5b and 5c show a front view of a detail of a first or second device comprising an annular groove, one annular protuberance and two parallel annular protuberances respectively, to help fix one end of a preform in position by means of a clamping flange.

FIG. 6 shows an example of a tensioning device according to the invention that can be used to make a preform with the shape of an 8 mm inside diameter tube.

FIGS. 7a to 7d show detail views of elements in the tensioning device in FIG. 6, namely a detailed view of the control rod 5 (FIG. 7a), a detailed view of the second assembly element 4 (FIG. 7b), a detailed view of the intermediate element 6 (FIG. 7c) and a detailed view of the first assembly element 3 (FIG. 7d).

DETAILED PRESENTATION OF PARTICULAR EMBODIMENTS

Figure 1:
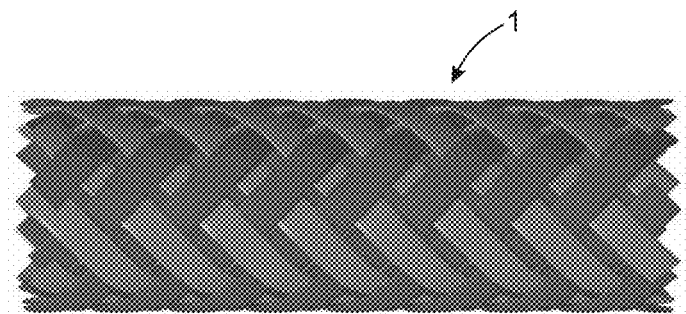
FIG. 1 diagrammatically shows a tubular shaped preform 1 obtained by 2D braiding of fibres.
Figure 2:
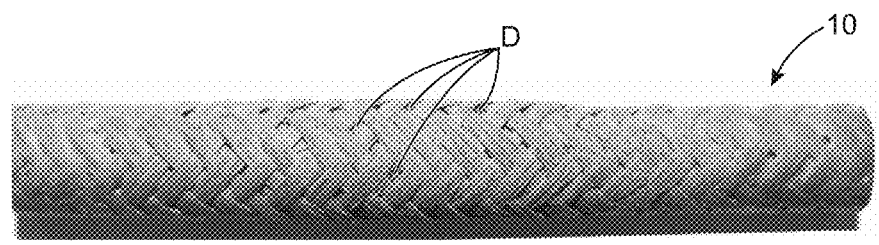
FIG. 2 is a photograph of a tube 10 made from a composite material obtained by a process according to prior art. Important shape defects (D) can be observed in the central part of the tube, due to relaxation of the fibrous texture of the preform before and/or during its densification.
Figure 3:
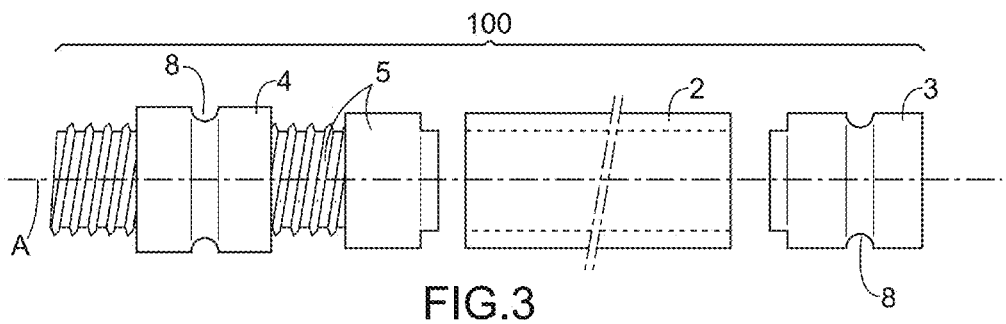
FIG. 3 shows an exploded perspective view of a first example of a tensioning device according to the invention.

With reference to FIG. 3, the figure shows the tensioning device 100 according to the invention extending along a longitudinal direction (A) composed of a slender main body 2 which in this case is tubular, a first assembly element 3 mounted on one end of the main body 2, a control rod 5 mounted on the other end of the main body 2 free to rotate about its axis, which coincides with the longitudinal direction (A), and a second assembly element 4 mounted on the control rod 5 through a helical connection. In fact, the helical connection in this case is obtained due to the presence of an external thread made on the external surface of the control rod and a corresponding internal thread made on the internal surface of the second assembly element (the second assembly element in this case being a threaded element, for example such as a nut).

In this case, the main body 2 and the first assembly element 3 are free to rotate about axis A independently of the control rod 5.

Note that all these elements are coaxial and that their axes coincide with the longitudinal direction (A).

Figure 4:
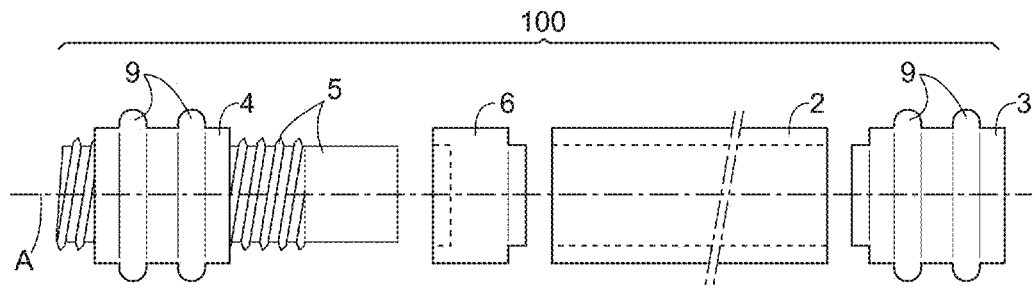
FIG. 4 shows an exploded perspective view of a second example of a tensioning device according to the invention.

With reference to FIG. 4, the figure shows that an intermediate device 6 has been added in the tensioning device 100 shown in FIG. 3. This intermediate device is arranged between the control rod 5 and the main body 2, and facilitates rotation of the control rod 5.

Note also that in FIG. 3 and also in FIG. 4, the use of an exploded view for the illustration shows that the first element 3 and the control rod 5 are at a distance from the main body 2, but in fact they are in contact with this main body when the tensioning device is being used.

Furthermore, in FIGS. 3 and 4, the main body 2 is actually much longer, as shown by the symbol //.

The ends of the preform can be held in place on the first and second assembly elements using clamping means, for example such as a flange, which once in position apply a radial clamping force on the assembly elements oriented towards the axis of said assembly elements. The ends of the preform may be held in place by applying an adhesive material, for example glue, at the interface between the assembly elements and the preform, either as a variant or in addition.

Furthermore, the first and second assembly elements may also be fitted with locking means, to make it easy to hold the preform in position on them.

FIGS. 5a, 5b and 5c show different possible locking means, namely an annular groove 8 (FIG. 5a), an annular protuberance 9 (FIG. 5b) and two parallel annular protuberances 9 (FIG. 5c), each with a main axis coincident with the main axis of the different coaxial elements of the tensioning device 100 (main body, first and second assembly elements, control rod, and possibly intermediate element). Note that a flange 7 (possible example of clamping means) has been shown so as to identify its position relative to said locking means, but the preform that will be sandwiched between the flange 7 and the first and second elements has not been shown to make the figures easier to read.

In FIG. 3, the first and second assembly elements are provided with an annular groove 8, the main axis of which coincides with the axis of the first and second assembly elements (and also with the longitudinal direction (A)).

In FIG. 4, the first and second assembly elements are provided with two parallel coaxial annular protuberances 9, the main axis of which coincides with the axis of the first and second assembly elements (and with the longitudinal direction (A)).

As an example of a particular embodiment of the process according to the invention, we will describe fabrication details of a part with tubular geometry and we will do this using the tensioning device shown in 4.

Firstly, the preform 1 is shaped on the tensioning device 100, said preform being dimensioned such that it can cover the main body 2, and the first and second assembly elements 3 and 4 of the tensioning device 100, so that the two ends of the preform can be fixed in position on the assembly elements 3 and 4. Note that since the tensioning device also comprises the intermediate element 6, the intermediate element is also covered by the preform.

The preform can be shaped on the tensioning device by any fibre interlacing shaping technique known in the state of the art.

This shaping can be done directly on the tensioning device or it can be done beforehand so that it can then be slid onto the tensioning device.

The fibres making up the preform are made from a ceramic material. They are preferably made from carbon or silicon carbide.

In this example, the fibres are made from silicon carbide and are interlaced by braiding to obtain a 3D braid type preform.

The two ends of the preform are then fixed in position on the first and the second assembly elements and thus become fixed to said first and second assembly elements. This is done using clamping flanges 7 arranged in the space between the two protuberances 9 provided on each of the first and second assembly elements 3 and 4, so as to clamp the two ends of the preform onto the first and second assembly elements respectively of the tensioning device 100.

The next step is to tension the preform until the required tension is obtained. This is done by applying a rotation movement to the control rod 5 that is transformed into a translation movement of the second assembly element 4.

This translation movement of the second assembly element 4 results in the first and second assembly elements 3 and 4 being moved away from each other which causes tensioning of the preform along the longitudinal direction (A) and tensioning of it.

Moreover, since the first assembly element, the main body and the intermediate element can rotate freely about their main axis corresponding to the longitudinal direction (A) (however it would suffice if only one of these elements is free to rotate about this main axis), rotation of the control rod only causes tensioning of the preform along the longitudinal direction; the preform is not twisted about this main axis.

Note that it is preferable to hold one of the assembly elements fixed in a coordinate system external to the tensioning device at the beginning of tensioning (for example the operator can hold one of the assembly elements fixed by holding it in one hand) during rotation of the control rod. This prevents any parasite rotation movement that might occur at the beginning of tensioning.

Note also that as tension of the preform on the tensioning device is increased, the volume content of fibres within the CMC composite material of the final part will increase.

Finally, the diameter (inside and outside) of the preform can be reduced by a few tens of millimeter to a few millimeters, depending on the manner in which the preform was shaped. It is clear that relaxation of fibres can vary depending for example on whether a 2D braid or a 3D braid is being used and therefore tensioning of the preform can have more or less effect on the preform diameter.

Consequently, tensioning of the preform can also significantly reduce the thickness of the preform. For example in the case of a 3D braid type preform with an inside diameter of about 8 mm (in other words the diameter of the mandrel used for shaping the preform by braiding) and a thickness of about 1 mm, the Inventors have successfully reduced the thickness of the preform to less than 0.7 mm, while guaranteeing inside dimensions (8 mm) and outside dimensions (9.4 mm) with a tolerance not more than ±0.05 mm.

When the required tensioning of the preform is obtained, the control rod 5 is no longer rotated and the densification of the preform thus tensioned is performed by carrying out a densification treatment, for example by Chemical Vapour Phase Infiltration (CVI), which causes the development of a matrix in the preform.

The preform can be densified using several processes known in the state of the art and therefore these processes are not described herein.

In this example embodiment, the preform is densified by placing the tensioned preform on the tensioning device at a high temperature less than the melting temperature of the preform.

Densification can be done in only one or in two steps. If it is done in two steps, the densification treatment is stopped when the volume content of the matrix of the treated preform is more than 5% and at most is equal to 60% of the matrix volume of the part to be made; the tensioning device is then removed from the partially consolidated preform and finally, the densification treatment of the preform is resumed to terminate the densification if necessary, at a temperature less than the melting temperature of the preform.

The preform fibres may for example be made from carbon or silicon carbide (but other ceramic materials are also possible); in this case, the densification treatment can lead to the formation of a carbon or silicon carbide matrix, depending on the applied densification temperature.

Obviously, it is important that the material(s) from which the different elements forming the tensioning device are made, and the materials from which the clamping means are made, and the adhesive material if any, are capable of resisting the temperature and chemical elements used during the densification.

It is also preferable if the coefficient of thermal expansion of the chosen materials is close to that of the preform, so that the tensioning device can follow the expansion of the preform during its densification and therefore maintain a stable tension in the preform.

Thus, when the fibres of the preform are made from carbon or silicon carbide, graphite elements are preferably chosen to form the tensioning device, and the clamping means are made from carbon and a carbon adhesive material (glue) (for example C34 "carbon" glue made by the UCAR Company).

The device tensioning the partially or completely consolidated preform may be removed using any known removal technique, for example by machining.

For example, removal may be done by sawing the first and second assembly elements of the tensioning device so that the main body can be removed, for example by machining or chemical attack; if the tensioning device also comprises an intermediate element, it can be sawn like the first and second assembly elements, or it can be removed by machining or any other removal technique.

As mentioned above, removal may also be done by chemical attack, particularly by chemical dissolution, this method being particularly advantageous for example when the main body of the tensioning device is silica glass.

Note that it is particularly advantageous to use a tensioning device for which the main body is made from silica glass when the part to be made has a small diameter (less than or equal to 15 mm) and/or a length of 50 mm or more, to be able to easily remove the main body by chemical attack (and assembly elements for example by sawing), and thus avoid changes to the inside and outside dimensions of the part.

Note that when a main body made from silica glass is used, it is preferable if the tensioning device is withdrawn before the preform is completely consolidated, in other words when the matrix volume content in the consolidated preform is between 5% and 40% of the matrix volume of the part to be made, as described above, so that the internal stresses caused by differences between the coefficients of expansion of the silica glass and the ceramic used (for example silicon carbide or carbon) do not generate any cracking or failure of the composite.

As described above, it is obvious that those skilled in the art will be able to determine the necessary distance between the first and second assembly elements to obtain the requirement tensioning of the preform.

The tension to be applied to the preform to tension it using the tensioning device according to the invention obviously depends on the nature and the texture of the fibres used to make the preform, but also on the dimensions of the part to be made, and the material from which the elements of the tensioning device are composed.

The calculation principle is explained below for tensioning a preform with an inside diameter of 8 mm and a thickness of 0.8 mm, made by 3D braiding of Hi-Nicalon S fibres made by Nippon Carbon, using a tensioning device according to the invention (shown in FIG. 6), for which the elements are made from graphite 2120 (Carbone Lorraine) and for which the dimensions of the elements are shown in FIGS. 7a to 7d.

Figure 7B:
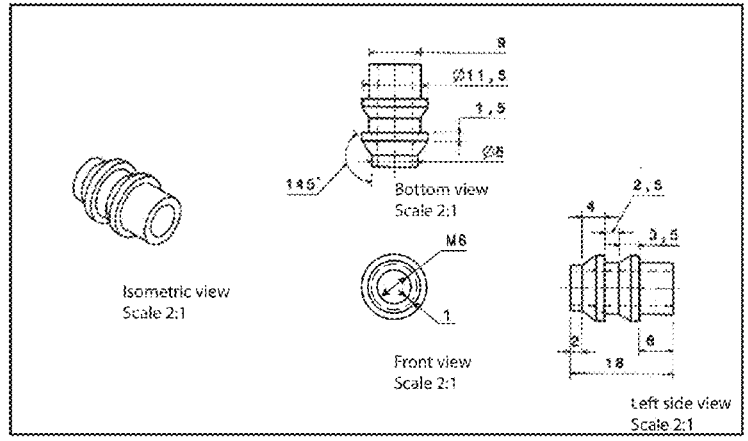
Figure 7C:
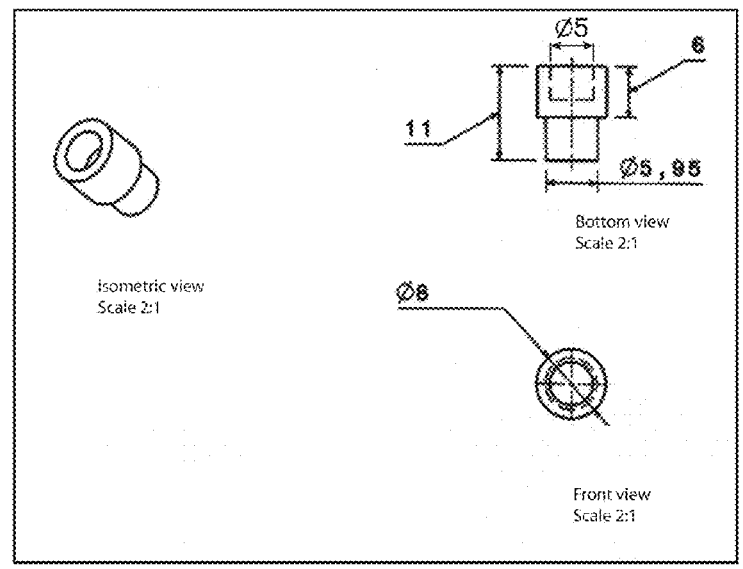
Figure 7D:
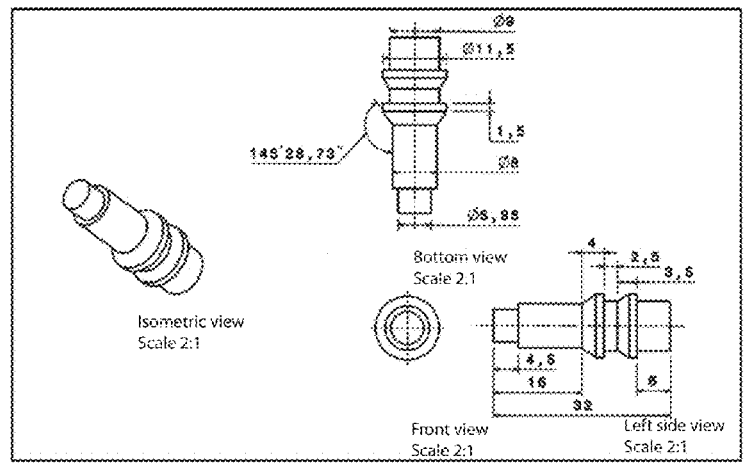

Note that the threads are not shown in FIG. 6 and in FIGS. 7a and 7b for reasons of clarity. However, it can be seen that this thread is present in the front views in FIGS. 7a and 7b and that it is an M6 thread.

The characteristics of the materials used for this example embodiment are shown in the following table:

| Characteristic | Hi-Nicalon S wires (Nippon Carbon) | Graphite 2120 (Carbone Lorraine) |
|---|---|---|
| Density | ~3 | 1.86 |
| Ultimate tensile stress (MPa) | 2500 | 35 |
| Ultimate compression stress (MPa) | — | 152 |
| Modulus of elasticity (GPa) | 315 | 15 |
| Deformation at failure (%) | ~0.6 | |

The first criterion to be used when tensioning the preform is the mechanical strength of the tensioning device. It is important not to load the device beyond its ultimate tensile strength. In fact, a safety factor is applied to the value of the ultimate strength of graphite since it is considered like a ceramic due to its brittleness. This avoids loading graphite to more than ⅓ of its ultimate strength.

In the example case, the part of the tensioning device with the highest tensile stress will be the threaded control rod. The ultimate tensile strength F(N) of this threaded rod is $=\sigma$ (MPa)$\times$S (mm$^2$).

As in this example, the threaded rod has a section (S) equal to about 200 mm$^2$, therefore its ultimate tensile strength will be F(N)=35×20=700 N. Therefore, based on the safety criterion given above (⅓), the maximum tension that must not be exceeded in the threaded rod when tensioning the preform is 233 N.

The second criterion to be taken into account is the strength of the preform and not applying excessive prestress on it which could degrade properties of the part once finished. Consequently, the properties of the preform at failure have to be known.

In our example embodiment, the ultimate strength of the preform is of the order of 10000 N for a strain of 0.6%. It is recommended that the stress applied to the preform should not exceed ¹⁄₅₀ of its ultimate strength, which in our example is equal to 10000/50=200 N, to assure that it is not excessively prestressed.

It is clear that these two criteria overlap in our example embodiment and that the preform should never be tensioned to more than 200 N in order to respect the two defined criteria.

The same reasoning can then be applied to a tensioning device and a preform with geometries different from those given in this example.

We have just described an example embodiment of a tubular shaped part, such as cladding. However, any other geometry of revolution is also possible, for example such as making a tube with a hexagonal section. All that is necessary to achieve this is to adapt the cross-sectional shape of the tensioning device accordingly.

Potential applications of the process according to the invention apply to the fabrication of any hollow parts made from ceramic matrix composite materials, preferably with an axis of revolution, made by interlacing fibres (2D, 3D braiding, etc.), for which it is important to respect the dimensions and mechanical properties. One particular example is the fabrication of a ceramic fuel cladding for fourth generation reactors.

The invention claimed is:

1. A tensioning device for tensioning a preform along a longitudinal direction thereof, the preform being made from interlaced fibres and comprising a body and two opposite ends, the device comprising:
a plurality of coaxial elements placed along an axis, the plurality of coaxial elements comprising a longitudinal main body, a control rod, a first bearing element, and a second bearing element, the longitudinal main body comprising a first end and a second end, the longitudinal main body being configured to support the body of the preform, the control rod being mounted on the first end of the longitudinal main body and rotatable about the axis, the control rod being configured to turn freely relative to at least one of the longitudinal main body and the first bearing element, the first bearing element being configured to bear one of the two opposite ends of the preform, the first bearing element being mounted on the second end of the longitudinal main body, the second bearing element being configured to bear the other one of the two opposite ends of the preform, the second bearing element being mounted on the control rod through a helical link, the rotation of the control about the axis being configured to cause the tensioning of the preform only along the longitudinal direction of and the translation of the second bearing element about the axis and a moving away of the second bearing element from the first bearing element without rotation of the first and second bearing elements in relation to each other,
wherein the plurality of coaxial elements are configured to cooperate with each other when the two opposite ends of the preform are beared by the respective first and second bearing elements.

2. The tensioning device according to claim 1, wherein, during the rotation of the control rod, at least one of the first and second bearing elements is held fixed relative to a coordinate system external to the tensioning device.

3. The tensioning device according to claim 1, wherein the control rod is assembled onto the first end of the longitudinal main body through an intermediate element, the intermediate element being coaxial with the longitudinal main body and the second bearing element and placed between the longitudinal main body and the second bearing element.

4. The tensioning device according to claim 1, wherein the control rod is a rod with an external thread and the second bearing element is a nut comprising an internal thread that cooperates with the external thread of the control rod.

5. A tensioning device for tensioning a preform along a longitudinal direction thereof, the preform being made from interlaced fibres and comprising a body and two opposite ends, the device comprising:
a plurality of coaxial elements placed along an axis, the plurality of coaxial elements comprising a longitudinal main body, a control rod, a first bearing element, and a second bearing element, the longitudinal main body comprising a first end and a second end, the longitudinal main body being configured to support the body of the preform, the control rod being mounted on the first end of the longitudinal main body and rotatable about the axis, the control rod being configured to turn freely relative to at least one of the longitudinal main body and the first bearing element, the first bearing element being configured to bear one of the two opposite ends of the preform, the first bearing element being mounted on the second end of the longitudinal main body, the second bearing element being configured to bear the other one of the two opposite ends of the preform, the second bearing element being mounted on the control rod through a helical link,
wherein the plurality of coaxial elements are configured to cooperate with each other when the two opposite ends of the preform are beared by the respective first and second bearing elements.

* * * * *